United States Patent [19]

Adamson

[11] 4,342,912
[45] Aug. 3, 1982

[54] APPARATUS FOR DETECTING AIR DISTURBANCES CREATED BY LOW LEVEL WIND SHEAR

[75] Inventor: Hugh P. Adamson, Golden, Colo.

[73] Assignee: University Patents, Inc., Norwalk, Conn.

[21] Appl. No.: 175,115

[22] Filed: Aug. 4, 1980

[51] Int. Cl.³ .............................................. G01J 1/00
[52] U.S. Cl. .................................... 250/339; 250/342; 374/123
[58] Field of Search ............... 250/338, 339, 342, 349, 250/353, 347; 73/170 R, 355 R

[56] References Cited

U.S. PATENT DOCUMENTS

3,696,670 10/1972 Collis .............................. 250/338 X
3,856,402 12/1974 Low et al. ............................ 356/342
3,935,460 1/1976 Flint ..................................... 250/349
4,266,130 5/1981 Kuhn ................................... 250/339

Primary Examiner—Davis L. Willis
Attorney, Agent, or Firm—O'Rourke & Harris

[57] ABSTRACT

Apparatus is described for detecting air disturbances created by low level wind shear. The apparatus includes optics for directing infrared radiation towards a continuously rotating chopper wheel having a plurality of infrared filters which have effectively different distance sensitivities and therefrom to a radiation sensor which produces an analog output signal that is demodulated by a synchronous demodulator. The demodulated signal is then routed through a gated integrator to a selective multiplexing circuit which has a plurality of output channels and is controlled by an electronic detector connected with the chopper wheel. Each channel includes a low pass filter and the outputs therefrom are coupled to a signal processor which thus receives periodically updated information to provide a display indicative of sensed air disturbances due to low level wind shear.

28 Claims, 5 Drawing Figures

Fig_1

Fig_3

Fig_2

Fig_4

Fig_5

APPARATUS FOR DETECTING AIR DISTURBANCES CREATED BY LOW LEVEL WIND SHEAR

FIELD OF THE INVENTION

This invention relates to an apparatus for detecting disturbances in air and, more particularly, relates to apparatus for detecting air disturbances created by low level wind shear.

BACKGROUND OF THE INVENTION

One of the more perplexing problems encountered by aircraft has been due to air disturbances created by low level wind shear. When wind shear occurs at lower altitudes, such shears have been heretofore difficult to detect with sufficient warning and thus constitute great danger to aircraft.

It has heretofore been suggested that clear air turbulence (which is encountered at higher altitudes) can be detected by detecting temperature gradients existing therein. One such system utilizing detection of infrared or microwave energy from the $CO_2$ band of the spectrum by use of a radiometric receiver is set forth by R. W. Astheimer in *Applied Optics*, Vol. 9, pg. 1789 (1970). A method and system for detecting clear air turbulence is also set forth in U.S. Pat. No. 3,696,670. In this patent, it is suggested that detection be based on water vapor anomalies.

One of the better know radiometers for detecting clear air turbulence is the Barnes Model PRT-5 Percision Radiation Thermometer. Clear air turbulence detection is also provided by the apparatus and method described in U.S. patent application Ser. No. 950,943, filed Oct. 13, 1978, now U.S. Pat. No. 4,266,130 by Peter M. Kuhn and entitled "Improved Method and Apparatus for Detecting Clear Air Turbulences." This application discloses a head assembly, processing circuitry and display unit that could be modified and utilized in this invention, as could appropriate structure of the Barnes Model PRT-5 Precision Radiation Thermometer. Atmospheric absorption as a function of frequency and distance in infrared applications is discussed in "Infrared Passbands for Clear Air Turbulence Detection" by Kuhn, Nolt, Stearns and Radostitz in *Applied Optics*, Vol. 3, No. 4, Oct. 1978.

While apparatus and methods have been heretofore suggested for detecting clear air tubulence, and improvements to such systems have also been heretofore suggested, such systems and/or methods have not been satisfactory in sensing air disturbances created by low level wind shear.

Systems for detection of air disturbances heretofore suggested have also commonly utilized either a single optical filter having a predetermined pass band or a plurality of filters each of which must be selected for a fairly long period of time in order to accomplish the desired end, and improvements in such systems accompanied by improved signal handling capabilities are also thought to be needed.

SUMMARY OF THE INVENTION

This invention provides a novel apparatus and method for detection of air disturbances created by low level, or altitude, wind shear. The system utilizes a continuously rotating chopper wheel having a plurality of infrared filters which have effectively different distance sensitivities through which infrared radiation is directed to a radiation sensor which develops an analog signal that is demodulated, integrated, multiplexed and successively coupled through a plurality of low pass filters to a signal processor which produces an output signal indicative of sensed air disturbance created by low level wind shear.

It is therefore an object of this invention to provide a novel apparatus and method for detection of air disturbances created by low level wind shear.

It is still another object of this invention to provide a novel apparatus and method for detection of air disturbances with high reliability and low erroneous indications of such disturbances.

It is still another object of this invention to provide an improved apparatus and method for detecting air disturbances created by low level wind shears utilizing a gated integrator to gate a demodulated signal to a selective multiplex circuit operating in conjunction with a continuously rotating chopper wheel having a plurality of infrared filters thereon.

With these and other objects in view, which will become apparent to one skilled in the art as the description proceeds, this invention resides in the novel construction, combination, and arrangement of parts substantially as hereinafter described, and more particularly defined by the appended claims, it being understood that such changes in the precise embodiment of the herein disclosed invention are meant to be included as come within the scope of the claims.

BRIEF DESCRIPTION OF THE DRAWINGS

The accompanying drawings illustrate a complete embodiment of the invention according to the best mode so far devised for the practical application of the principles thereof, and in which.

DESCRIPTION OF THE INVENTION

Figure 1:
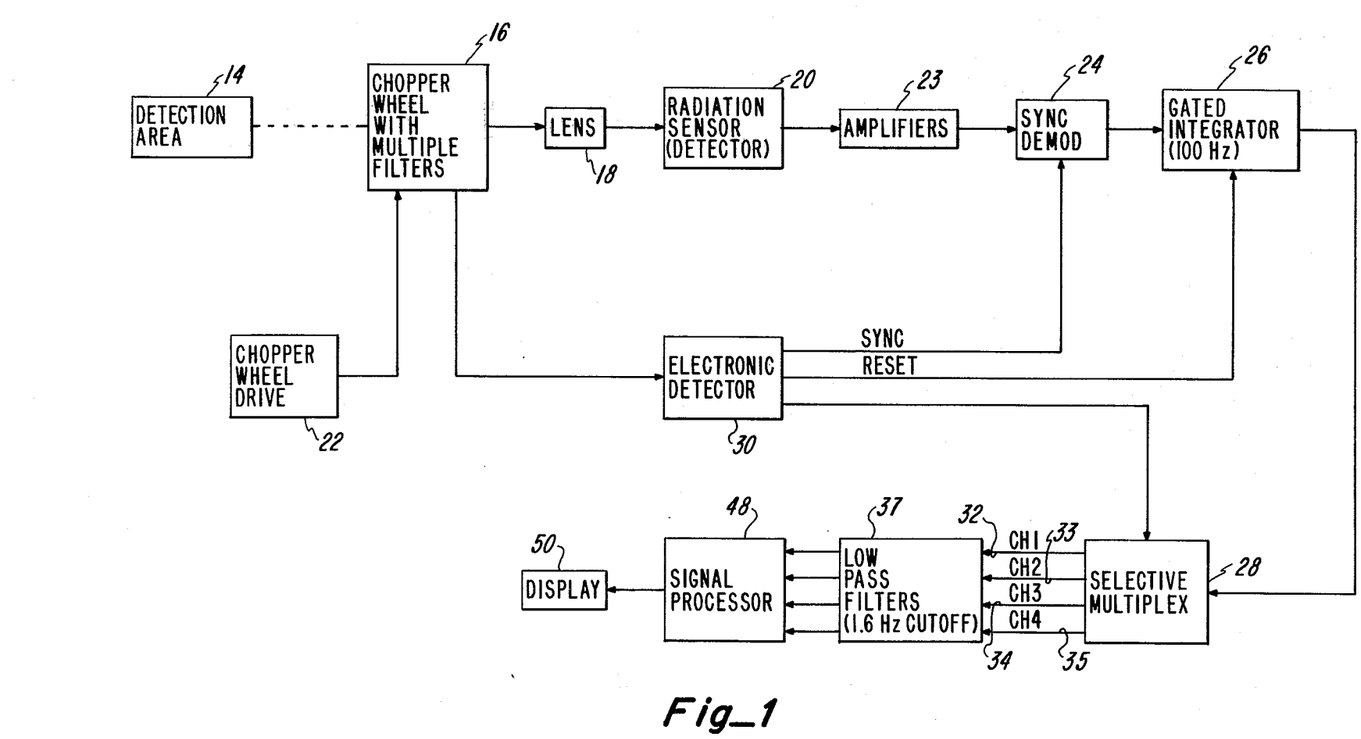
FIG. 1 is a block diagram of the device of this invention useful for detection of air disturbances created by low altitude wind shear.
Figure 2:
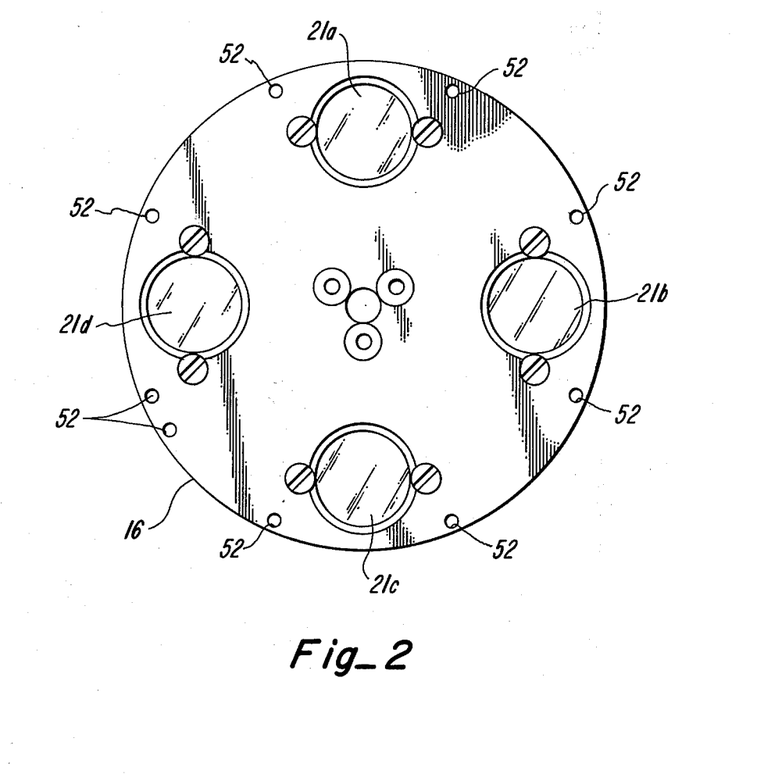
FIG. 2 is a front view of the chopper wheel assembly having four filters positioned thereon.

As shown in FIG. 1, infrared radiation from a detection area 14 is directed through chopper wheel 16 and lens 18 with the directed infrared energy from lens 18 being coupled to radiation sensor 20. Chopper wheel 16 has multiple filters thereon and preferably has four filters 21a, 21b, 21c and 21d disposed about the periphery of the wheel as shown in FIG. 2. It has been found that the filters should have different infrared frequency bandpasses so that the effective sensed distance is different for each filter and hence the device is thus able to sequentially sense different detected areas and, more particularly, sense temperature variations at different spatial locations. In the particular device tested, it has been found that filters having bandpasses of about 0.5 $\mu$m with the individual filters having frequencies of about 14 to 14.5 $\mu$m, 14.5 to 15 $\mu$m, 15 to 15.5 $\mu$m and 15.5 to 16 $\mu$m have been effectively utilized.

Chopper wheel 16 is continuously rotated by chopper wheel drive 22 in a conventional manner. By continuous rotation of the chopper wheel, each filter of the multiple filters is repeatedly and sequentially brought into the path of the radiation being directed through lens 18 to sensor 20.

The analog signal developed by radiation sensor 20 is coupled through amplifiers 23 to synchronous demodulator 24 the output of which is routed through gated integrator 26 to selective multiplex circuit 28. As indicated in FIG. 1, a plurality of output channels is provided by selective multiplex circuit 28 with output channel selection being controlled by electronic detector 30 which detector is connected with chopper wheel 16. As also shown in FIG. 1, electronic detector 30 also provides a sync output to synchronous demodulator 24 and a reset output to gated integrator 26.

Four output channels 32, 33, 34 and 35 are provided from selective multiplex circuit 28 and each of these outputs are coupled to a separate low pass filter generally designated by the numeral 37. Each of these low pass filters may be identical and is illustrated in greater detail by the block diagram of FIG. 3.

Figure 3:
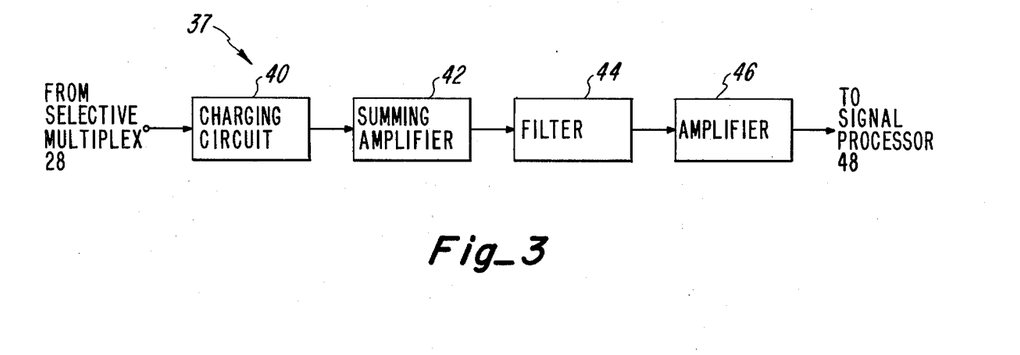
FIG. 3 is a block diagram of the low pass filters shown in FIG. 1.

As shown in FIG. 3, each filter 37 preferably has a 1.6 Hz cutoff, and includes a charging circuit 40 connected to receive the input from the selective multiplex circuit 28, a summing amplifier 42, a filter 44, and an amplifier 46 with the output of the amplifier being coupled to signal processor 48 where each signal is resolved and a determination made therefrom as to whether a low level wind shear exists and if so, an indication thereof is coupled to display 50.

Signal processor 48 senses the presence of air disturbances created by low level wind shear by detecting temperature gradients existing at different distances determined by the filters 21. Processor 48 senses the temperature indicative inputs and couples these inputs to one of the four channels. If deviation exceeds a predetermined limit, this is indicative of moderate turbulance. If deviation exceeds a higher predetermined limit, this is indicative of severe turbulance. The limits may be established empirically for various expected disturbances. Thus, if mounted in an aircraft, the predetermined distances are selected to allow sufficient warning to enable warning and/or diversion of the aircraft. The display can be a visual, or light, display such as red, amber and green to indicate severity by color code.

With respect to the prior art, a stepped-function filter has normally heretofore been utilized with the filter being positioned by a stepping motor and with the filter being held in position for fairly long periods of time (for example, thirty seconds) due to mechanical restraints. In this invention, a repeated update is provided by continuously spinning the filter assembly at a speed of, for example, about 1500 rpm (which equates with a 100 Hz chopping rate) with decoding provided for identification of each filter as it passes the infrared detector with the decoding being provided to the selective multiplexer. The filters are selected to detect temperature differences at different distances and at different spectral frequencies as is brought out hereinabove and as brought out in the above-identified references and particularly in the Kuhn reference. The input to the electronic detector for use in decoding may be provided, for example, by apertures 52 (FIG. 2) in the chopper wheel as is well known.

As indicated in FIG. 1, the signal from the detector is amplified, filtered and synchronously demodulated to that of a DC level representing the temperature difference sensed. This DC output is then coupled to the gated integrator which has a 100 Hz frequency response and then to the selective multiplexing circuitry so that the output of each filter is processed through a separate channel each containing a low pass filter. With the electronic decoder of this invention, signal processor 48 successively receives an output from each filter at an update rate of 25 Hz.

Figure 4:
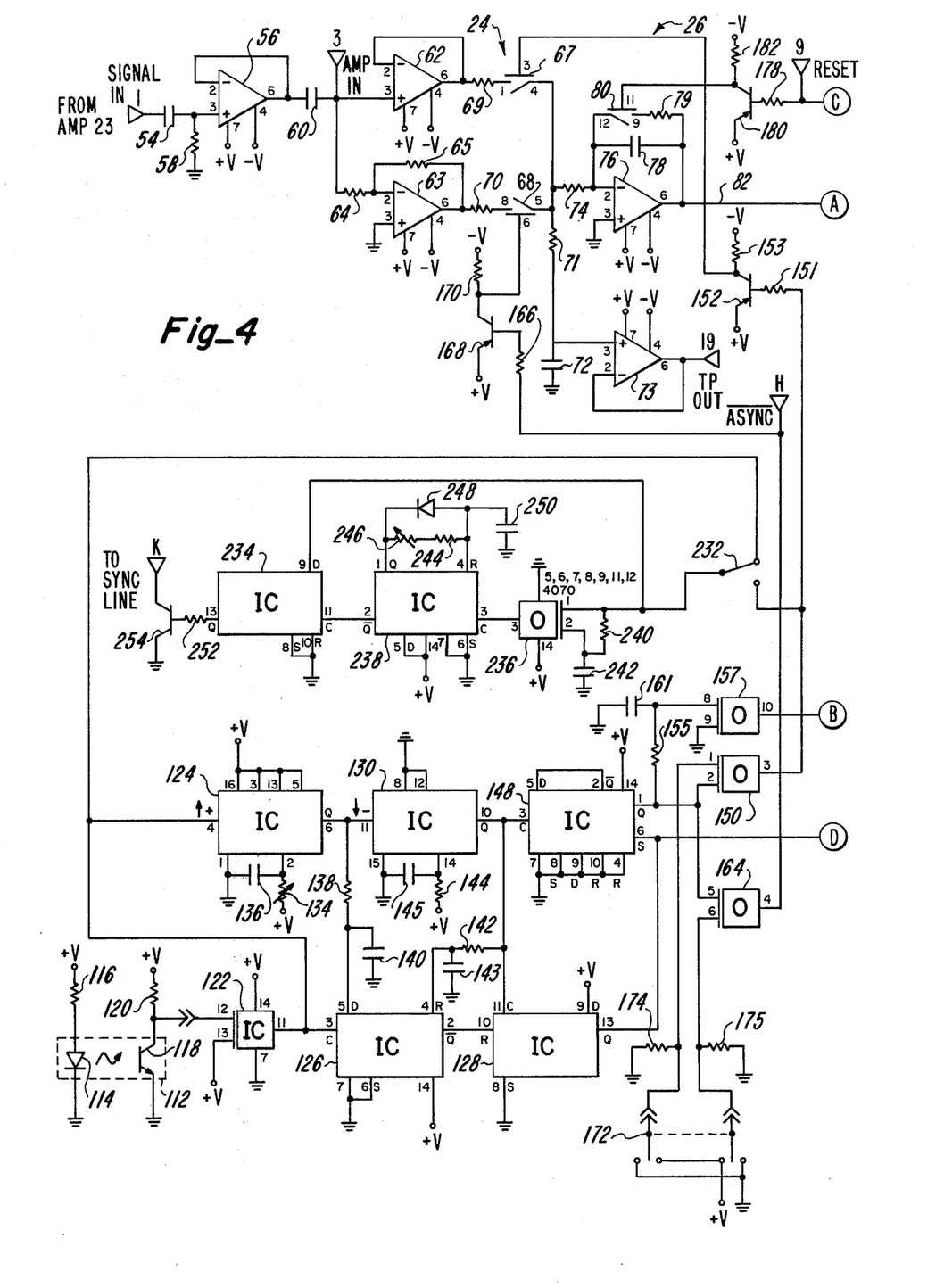
FIGS. 4 and 5 taken together form a schematic diagram of the apparatus for detecting low level wind shear.
Figure 5:
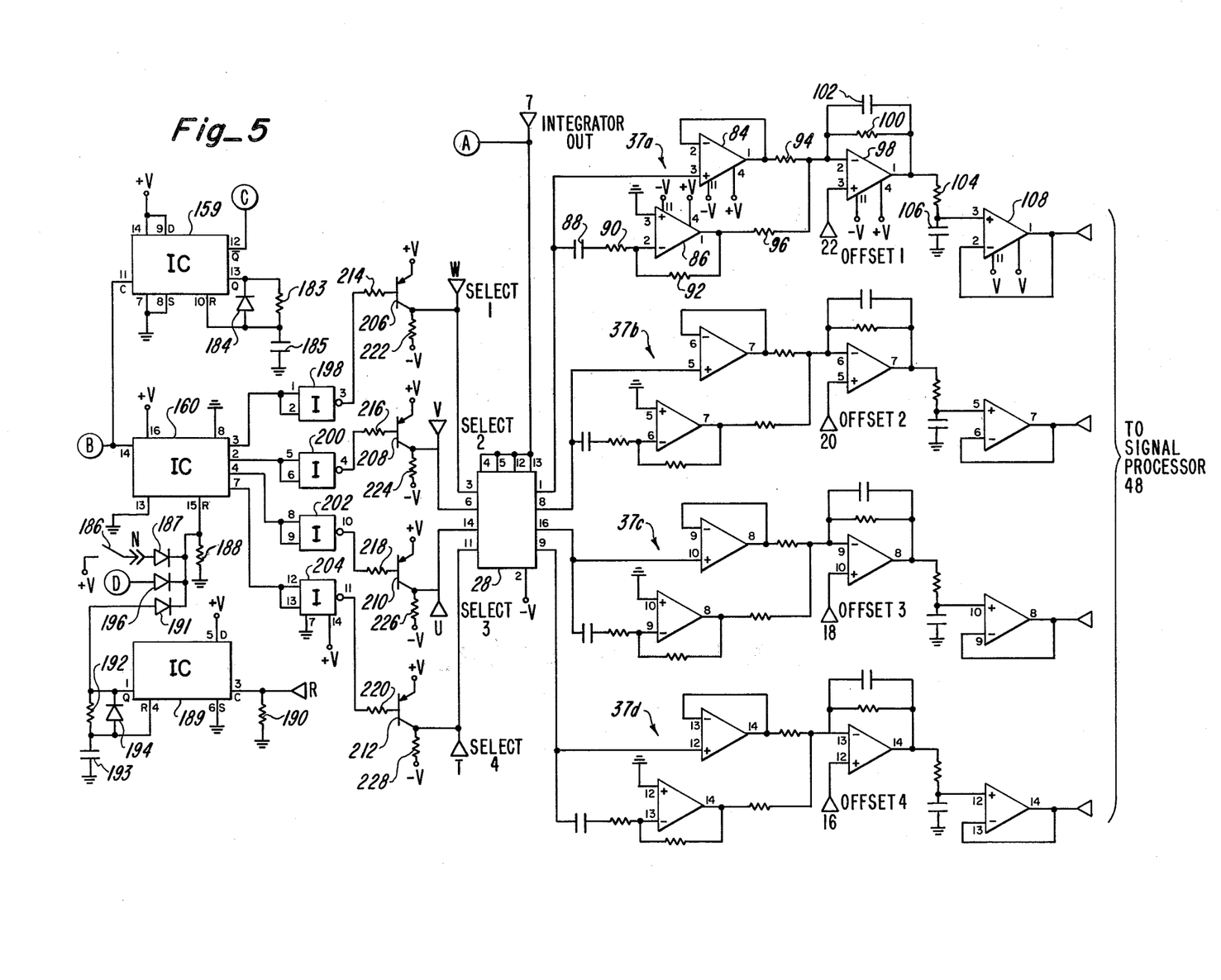

A partial electronic schematic of the apparatus for detecting low level wind shear is shown in FIGS. 4 and 5. As shown, an input signal, i.e., an amplified analog signal from a radiation detector 20 amplified by amplifier 23, is coupled through capacitor 54 to the positive input of buffer 56 with the positive input having a resistor 58 to ground thereat.

The output from buffer 56 is coupled through capacitor 60 to the positive and negative inputs, respectively, of integrated circuits 62 and 63, the latter being coupled to the negative input through resistor 64 (which negative input also receives a feedback from the output of integrated circuit 63 through resistor 65). By this arrangement, the original signal and a signal 180° out of phase with the original is thus presented to demodulator 24 (which comprises integrated circuits 67 and 68). The outputs of integrated circuits 62 and 63 are coupled to integrated circuits 67 and 68 through resistors 69 and 70, respectively. A low pass filter, consisting of resistor 71 and capacitor 72 (the junction of which is connected to the positive input of buffer 73), is provided to monitor the demodulated signal.

The demodulated signal is coupled to the gated integrator to get $-\int_0^t v(t)dt$. As shown in FIG. 4, the combined output from integrated circuits 67 and 68 is coupled through resistor 74 to the negative input of integrated circuit 76 with the negative input also receiving feedback from the output of integrated circuit 76 through capacitor 78 and through series connected resistor 79 and integrated circuit 80. The output from gated integrator 26 is coupled by means of lead 82 to the selective multiplex circuit 28.

As shown in FIG. 5, the outputs from the selective multiplex circuitry 28 are coupled by channels to each of the four low pass filters 37A, 37B, 37C and 37D. Each of these may be substantially identical and hence only one is described in detail herein. As shown, the output of pin 1 of integrated circuit 28 is coupled to the positive input of amplifier 84 and to the negative input of amplifier 86 through series connected capacitor 88 and resistor 90, which negative input has a feedback from the output through resistor 92. The outputs from amplifiers 84 and 86 are coupled through resistors 94 and 96, respectively, to the negative input of amplifier 98, with the negative input having a feedback coupled to parallel connected resistor 100 and capacitor 102. The output from amplifier 98 is coupled through a filter consisting of resistor 104 and capacitor 106 to the positive input of amplifier 108 from which the output from the circuit is taken.

Low pass filters 37 operate as follows: when a channel is selected, the electronic switch, i.e., the selective multiplexer 28, abruptly closes and the ramping integrator is connected to capacitor 88 and positive input of amplifier 84 at a time when the integrator has been reset and is approximately zero volts. The integrator then begins integrating the demodulated signal. The switching and ramping are passed by both amplifier 84 and amplifier 86 and are cancelled since they are 180° out of phase. But the DC level on capacitor 88 is changed at a frequency $\leq 1.6$ Hz. When the selection circuit (multiplexer) has moved on to the next channel, there is no more AC component and amplifier 86 equals zero volts. However, the DC level on capacitor 88 may have changed and this is reflected at the summing junction of amplifier 98. The summing amplifier has a gain of $$-(V_1 - V_2) \frac{R_{100}}{R_{94} // R_{96}}$$

which means that the DC level out of amplifier 98 is the DC level of capacitor 88. Thus, all is ignored except the end product during multiplexing. The outputs of any of the channels can be offset to any DC level by a potentiometer (not shown) connected to pin 22 of amplifier 98 as needed for calibration.

The optical transmissive sensor 112 (TIL 138) is located adjacent to the chopper wheel assembly (and may be an integral part thereof) with the light emitting diode 114 being connected between a plus voltage source and ground through resistor 116. The sensing transistor 118 is likewise connected between ground and a plus voltage source through resistor 120. Passing of light to the transistor 118 causes a downward transition at pin 12 of integrated circuit 122 which results in a digital upward transition of pin 11 of integrated circuit 122. This is coupled to monostable multivibrator 124 initiated by the positive going transitions. If there are no positive going transitions (at pin 4 of monostable multivibrator 124) during the period that the monostable multivibrator is active, then nothing occurs in integrated circuits 126 and 128 (connected with pin 4 of multivibrator 124) and this results in integrated circuit 130 being initiated on the negative transition of the multivibrator 124. As shown, multivibrator 124 has pin 2 connected to the plus voltage through potentiometer 134 and with ground through capacitor 136 while pin 5 of integrated circuit 126 is connected to pin 11 of integrated circuit 130 through resistor 138 having a capacitor 140 to ground connected thereto. In addition, integrated circuit 126 is connected to the output pin 10 of integrated circuit 130 through resistor 142 having a capacitor 143 to ground connected therewith. Pin 14 of integrated circuit 130 is connected with the plus voltage through resistor 144 and with ground through capacitor 145.

The output from integrated circuit 130 is coupled to integrated circuit 148 which generates the sync signal which signal is delayed in time by the period of monostable multivibrator 124. The delayed sync output from integrated circuit 148 is coupled through exclusive OR gate 150 and resistor 151 to the base of transistor 152, the collector of which is connected to the negative voltage source through resistor 153 and provides the switching control for integrated circuit 67. The delayed sync output from integrated circuit 148 is also coupled through resistor 155 and exclusive OR circuit 157 to integrated circuits 159 and 160, with the junction thereto also having a capacitor 161 to ground connected thereto.

The output from the integrated circuit 148 is also coupled through exclusive OR gate 164 and resistor 166 to the base of transistor 168, the collector of which is connected with the negative voltage source through resistor 170 and to control switching of integrated circuit 68 by providing sync thereto. As shown, the other input to exclusive OR gate 150 is coupled through direction circuitry which includes ganged switch 172 having resistors 174 and 175 (resistor 175 being connected with exclusive OR gate 164) to ground connected therewith. Transistors 152 and 168 provide the necessary level conversion for the demodulator through the sync and sync inputs.

The output through exclusive OR circuit 150 to integrated circuit 159 is used to reset gated integrator 26. As shown, the output from integrated circuit 159 is coupled through resistor 178 to the base of transistor 180 the collector of which is connected through resistor 182 to the negative voltage supply and with the output of the collector also being utilized to control reset in integrated circuit 80. Pins 10 and 13 of integrated circuit 159 are connected by parallel connected resistor 183 and diode 184, the junction of which has a capacitor 185 to ground connected therewith. In this embodiment, integrated circuit 159 is used as a one shot multivibrator with level conversion being handled by transistor 180.

Integrated circuit 160 is a one of four decoder and the reset line can be controlled by any one of three inputs: (1) by a manual switch 186 through diode 187 having a resistor 188 to ground connected thereto; (2) by the output of one shot multivibrator 189 (which is reset by an input to pin 3 through a resistor 190 to ground connected therewith) through diode 191 the connection of which is connected with ground through series connected resistor 192 and capacitor 193 with resistor 192 having a diode 194 in parallel therewith; and (3) by the selective multiplexing circuitry reset through diode 196.

The outputs from decoder 160 are coupled through inverters 198, 200, 202 and 204 to the bases of transistors 206, 208, 210 and 212 through resistors 214, 216, 218 and 220, respectively. The collectors of transistors 206, 208, 210 and 212 are connected with the negative voltage supply through resistors 222, 224, 226 and 228, respectively, the output from the collectors then being coupled to the selective multiplexing circuit 28. The level changed decoder lines are connected more specifically to the multiplexing circuitry 28 by being connected to the gates of a quad bilateral switch (multiplexing circuitry 28) where the analog signals are decoded to their respective channels.

Integrated circuits 126 and 128 provide for reset of the selective multiplexing circuit 28 as follows: the chopper wheel is encoded with two holes for each filter and one extra hole preceding the hole for the first filter. As brought out hereinabove, if there are no passings of light during the time monostable multivibrator 124 is active then integrated circuits 126 and 128 do nothing, however, if there are two passings or more during the time that monostable multivibrator 124 is active then monostable multivibrator 124 is retriggered and times out from the last passing of light. When this occurs integrated circuit 126 is triggered at a time when the "D" input of integrated circuit 126 is high and a positive transition of the clock of a "D" input flip-flop when the "D" input is high transfers the "D" output to the Q output so that pin 1 of integrated circuit 126 goes high and the Q (pin 2) goes low since the reset of integrated circuit 128 is low when the Q output (pin 10) of integrated circuit 126 goes high, a high is transferred to the Q output (pin 13) of integrated circuit 128 and a reset pulse is generated.

As shown in FIG. 4, the output from the integrated circuit 150 (i.e., the sync output) can also be coupled through switch 232 either directly to integrated circuit 234 or through exclusive OR circuit 236 and integrated circuit 238 thereto. As shown, pin 2 of exclusive OR circuit 236 has a resistor 240 connecting pin 2 with pin 1, and a capacitor 242 to ground connected thereto.

Integrated circuit 238 has the Q and reset inputs connected to one another through resistor 244 and potentiometer 246 having a diode 248 in parallel therewith with the reset input also having a capacitor 250 to ground connected thereto. The output from integrated circuit 234 is coupled through resistor 252 to the base of transistor 254 the output of which provides a sync line to auxiliary equipment.

The width time of the reset pulse generated by integrated circuit 128 is short due to the fact that the same signal that generated it will terminate it after the delay of the time constant formed by resistor 142 and capacitor 144 (the RC time constant $\approx 10^{-6}$ seconds). The reset pulse has two functions one of which is to guarantee that the polarity of the sync signal remains the same with respect to the reset pulse (this is accomplished by resetting the set input on integrated circuit 148 each reset pulse, which reset has priority over the other functions and guarantees that the Q output on integrated circuit 148 must be high at reset), and the reset zeros the decoder 160 which guarantees that the next three filters will be decoded out in proper order. An advantage of this system is that the chopper wheel may be decoded in any manner by simply inserting or deleting extra holes.

In a working embodiment of this invention as shown in FIGS. 4 and 5, the following components were utilized, it being meant to be realized that the listed components are meant to be illustrative of a working embodiment and not as a limitation of the invention. The components are as follows:

Resistors: 58-100K; 64-10K; 65-10K; 69 & 70-10; 71-150K; 74-10K; 79-50; 90-100K; 92-100K; 94-160K; 96-160K; 100-160K; 104-100K; 116-330; 120-30K; 138-1K; 142-1K; 144-10K; 151-10K; 153-5K; 155-10K; 166-10K; 170-5K; 174 & 175-10K; 178-10K; 182-5K; 183-75K; 188-10K; 190-10K; 192-5K; 214, 216, 218 & 220-10K; 222, 224, 226 & 228-5K; 240-10K; 244-15K; and 252-10K.

Potentiometers: 134-0 to 100K; and 246-0 to 100K.

Diodes: 184, 187, 191, 194 and 196-IN4148; and 248-IN914.

Capacitors: 54-0.1 µF; 60-0.27 µF; 72-0.1 µF; 78-0.27 µF; 88-1 µF; 102-1 µF; 106-1 µF; 136-0.068 µF; 140-1000PF; 143-1000PF; 145-1000PF; 161-20PF; 185-1000PF; 193-100PF; 242-1000PF; and 250-0.05 µF.

Transistor: 152-2N3906; 168, 180, 206, 210 and 212-2N2907; and 208-2N3906.

Inverters: 198, 200, 202 and 204-4001; and 254-2N2222.

Exclusive OR: 150, 157, 164 and 236-4070.

Integrated Circuits and/or amplifiers: 28-SD5200; 56-LF356; 62 & 63-LF356; 67 & 68-SD5200; 73-LF356; 76-LF356; 80-SD5200; 84-HA4741; 86-HA4741; 98-HA4741; 108-LM324; 126-CD4013; 128-CD4013; 124 and 130-MC14528; 148-CD4013; 159-CD4013; 160-CD4017; 234-CD4013; and 238-CD4013.

In operation on an aircraft, the display will normally be a green light indicating that no air disturbance due to low level wind shear is being then sensed at the ranges, or distances, determined by the filters being used. If temperature gradients are sensed indicative of moderate wind shear, the yellow light in the display will be energized and the green light deenergized. If temperature gradients are sensed indicative of severe wind shear, the red light in the display will be energized and the yellow light (if then energized) will be deenergized.

Thus, as can be appreciated from the foregoing, this invention provides an improved device and method for detecting air disturbances created by low level wind shear.

What is claimed is:

1. An apparatus for detecting disturbances in air created by low level wind shear, said apparatus comprising:
   signal developing means for receiving optical indications relating to disturbances in air created by low level wind shear and providing electronic signal outputs indicative thereof, said signal developing means including filter varying means for repeatedly successively injecting predetermined different optical filters into the path of said received optical indications so that said electronic signal outputs are indicative of optical indications received through different ones of said filters;
   first signal processing means connected with said signal developing means to receive said electronic signal outputs therefrom and responsive thereto providing processed output signals indicative of said electronic signal outputs received from said signal developing means;
   a plurality of output channels such of which includes electronic filter means;
   multiplexing means connected with said first signal processing means to receive said processed signal outputs therefrom and connected with said filter varying means whereby said processed signal outputs are sequentially directed to each channel of said plurality of output channels; and
   second signal processing means for receiving the outputs of said plurality of output channels and providing therefrom an output indicative of air disturbance created by low level wind shear.

2. The device of claim 1 wherein said signal developing means includes a lens and a radiation detector for receiving infrared radiation from a detection area, and wherein said filters are infrared filters.

3. The device of claim 1 wherein said filter varying means includes a continuously rotating chopper wheel having said filters positioned thereon.

4. The apparatus of claim 3 wherein said apparatus includes an electronic detector connected with said chopper wheel and said multiplexing means for controlling channel selection from said multiplexing means.

5. The apparatus of claim 1 wherein said first processing means includes integration means.

6. The apparatus of claim 5 wherein said integration means is a gated integrator having a frequency response of about 100 Hz.

7. The apparatus of claim 1 wherein each of said electronic filters is a low pass filter having about a 1.6 Hz cut-off.

8. A device for detecting disturbances in air due to low level wind shear by infrared measurement of sensed temperature differences, said device comprising:
   optic means for collecting infrared radiation emanating from a predetermined area;
   chopper means in the path of said radiation collected by said optic means for successively injecting a plurality of filters into the path of said radiation;
   radiation detecting means for receiving said collected and filtered radiation and responsive thereto providing separate analog output signals indicative of radiation received through each of said filters;

synchronous demodulation means connected with said radiation detecting means to receive said analog output signals therefrom and responsive thereto providing demodulated output signals indicative thereof;

gated integrator means connected with said synchronous demodulation means to receive said demodulated output signals and responsive thereto providing output signals indicative thereof;

a plurality of output channels each of which has a low pass electronic filter with a cutoff of about 1.6 Hz;

selective multiplexing means connected with said integrator means and with said chopper means for directing said output signals from said integration means to different ones of said output channels; and processing means connected with said output channels to receive the output therefrom and responsive thereto providing an indication of sensed air disturbances due to low level wind shear.

9. The device of claim 8 wherein said device includes an electronic detector connected between said chopper means and said selective multiplexing means, said electronic detector also being connected with said synchronous demodulation means and said gated integrator means.

10. An apparatus for detecting air disturbance created by low level wind shear by measurement of infrared radiation emanating from predetermined areas, said apparatus comprising:

chopping means having a plurality of infrared filters;

drive means for causing said infrared filters to be repeatedly sequentially brought into the path of said infrared radiation;

optic means for collecting infrared radiation emanating from a predetermined area and passing through said infrared filters and directing the same in an infrared path;

radiation detecting means for receiving said radiation is said infrared path and providing therefrom analog signals indicative of said received radiation;

demodulation means for receiving said analog signals from said radiation detecting means and providing demodulated output signals indicative thereof;

selective multiplex means providing a plurality of output channels;

gated integration means connected with said demodulation means to receive said demodulated output signals therefrom and routing the same to said selective multiplex means;

an electronic detector connected with said chopping means and said selective multiplex means to control the output by channels of said selective multiplex means;

a plurality of low pass electronic filter means each of which is connected with a different one of said selective multiplex means to receive said output therefrom and provide output signals based upon infrared radiation passed through a predetermined one of said plurality of infrared filters and detected by said radiation detecting means; and signal processing means connected with said plurality of low pass electronic filter means and responsive to the outputs therefrom providing an output signal indicative of air disturbance created by low level wind shear.

11. The apparatus of claim 10 wherein said gated integration means has a frequency response of about 100 Hz.

12. The apparatus of claim 10 wherein each of said low pass electronic filter means has a cut-off frequency of about 1.6 Hz.

13. The apparatus of claim 10 wherein said demodulation means is a synchronous demodulator and wherein said electronic detector provides a sync signal to said synchronous demodulator.

14. The apparatus of claim 10 wherein said chopping means is a chopper wheel, and wherein said drive means causes said chopper wheel to be continuously rotated to bring said filters repeatedly sequentially into said infrared path.

15. An apparatus for detecting low level wind shear having demodulation means for providing a demodulated signal indicative of a sensed radiation level and integrating means connected therewith providing an integrated output signal, a low pass electronic filter comprising:

charging means connected with said integrating means to receive said integrated output therefrom with the DC level of said charging means being at a predetermined low frequency; and summing amplifier means connected with said charging means and receiving said integrated output from said integrating means, said summing amplifier means providing a DC output signal the level of which is dependent upon the DC level of said charging means.

16. The low pass filter of claim 15 wherein said predetermined low frequency is about 1.6 Hz.

17. The low pass filter of claim 15 wherein said filter includes filter means and amplifier means connected with said summing amplifier.

18. A method for detecting disturbances in air created by low level wind shear, said method comprising:

successively injecting predetermined optical filters into the path of received optical radiation and developing therefrom electronic signals indicative of information relating effectively to different distances;

processing said electronic signals and routing the same through different paths determined by the optical filter through which the optical radiation passed; and utilizing said electronic signals from said different paths to determine air disturbances created by low level wind shear.

19. The method of claim 18 wherein said optical filters are successively injected into the path of received optical radiation by rotation of a chopper wheel having said filters positioned thereon.

20. The method of claim 18 wherein said electronic signals are processed by demodulating said signals and then integrating the same before routing to said different paths.

21. The method of claim 18 wherein said electronic signals are filtered while in each of said different paths.

22. The method of claim 18 wherein said optical filters are infrared filters so that received infrared radiation is filtered and said electronic signals are developed therefrom.

23. A method for detecting disturbances in air due to low level wind shear, said method comprising:

receiving infrared radiation;

repeatedly successively passing said received infrared radiation through a plurality of infrared filters of different frequencies whereby temperature gradients at different effective distances are sensed;

developing from said filtered infrared radiation electronic signals indicative of said temperature gradients for each effective distance sensed;

processing said electronic signals and routing the same to different channels based upon each said effective distance;

electronically filtering said signals while in said different channels; and utilizing said electronically filtered signals from said different channels to determine air disturbance due to low level wind shear.

24. The method of claim 23 wherein said infrared filters are positioned on a chopper wheel and said chopper wheel is continuously rotated to successively bring each of said infrared filters into the path of received infrared radiation.

25. The method of claim 24 wherein said processed electronic signals are multiplexed into different paths under control of an electronic detector connected with said chopper wheel.

26. The method of claim 23 wherein said electronic signals are processed by demodulating the same is a synchronous demodulator and then integrating the demodulated signals in a gated integrator.

27. The method of claim 26 wherein said demodulated signals are integrated by a gated integrator having a frequency response to about 100 Hz.

28. The method of claim 23 wherein said electronic filtering is achieved by passing said signals through a low pass filter having about a 1.6 Hz cutoff.

* * * * *

UNITED STATES PATENT AND TRADEMARK OFFICE
CERTIFICATE OF CORRECTION

PATENT NO. : 4,342,912
DATED : August 3, 1982
INVENTOR(S) : Hugh P. Adamson

It is certified that error appears in the above—identified patent and that said Letters Patent is hereby corrected as shown below:

Column 4, line 30, after "-$_o$" insert -- $\int$ --

Column 5, line 5, delete "//" and insert -- $\|$ --

Column 6, line 57, delete "Q" and insert --$\bar{Q}$--

Column 7, line 19, delete "Q" and insert --$\bar{Q}$--

Column 8, line 28, delete "such" and insert --each--

Column 12, line 13, delete "to" and insert --of--

Signed and Sealed this

Twelfth Day of October 1982

[SEAL]

Attest:

GERALD J. MOSSINGHOFF

Attesting Officer     Commissioner of Patents and Trademarks